United States Patent [19]

Engel

[11] Patent Number: 5,712,549
[45] Date of Patent: Jan. 27, 1998

[54] DC MOTOR DRIVE ASSEMBLY HAVING A CONTROLLER/CHARGE WITH REGENERATIVE BRAKING

[75] Inventor: Gabriel D. Engel, Ames, Iowa

[73] Assignee: Tenergy L.L.C., New Britain, Conn.

[21] Appl. No.: 606,485

[22] Filed: Mar. 4, 1996

Related U.S. Application Data

[63] Continuation-in-part of Ser. No. 399,814, Mar. 19, 1995, abandoned.

[51] Int. Cl.[6] .................................................. H02P 03/18
[52] U.S. Cl. ........................ 318/376; 318/139; 320/64
[58] Field of Search .................................. 318/371, 375, 318/372, 373, 254, 138, 439, 382, 376; 363/20, 14, 15; 320/43, 61, 64

[56] References Cited

U.S. PATENT DOCUMENTS

| 3,665,221 | 5/1972 | Wickliff . |
| 3,943,423 | 3/1976 | Hoffman . |
| 3,974,660 | 8/1976 | Farr . |
| 4,366,388 | 12/1982 | Wilkerson . |
| 4,386,299 | 5/1983 | Pham ........................... 318/375 |
| 4,491,768 | 1/1985 | Slicker . |
| 4,602,322 | 7/1986 | Merrick . |
| 4,626,750 | 12/1986 | Post . |
| 4,654,776 | 3/1987 | Basire . |
| 4,819,147 | 4/1989 | Bingham . |
| 4,920,475 | 4/1990 | Rippel . |
| 5,055,994 | 10/1991 | Schoofs . |
| 5,099,186 | 3/1992 | Rippel et al. . |
| 5,319,292 | 6/1994 | Backstrand ........................ 318/371 |
| 5,332,954 | 7/1994 | Lankin . |
| 5,341,075 | 8/1994 | Cocconi . |
| 5,583,751 | 12/1996 | Nakazawa ........................ 363/20 |

*Primary Examiner*—John W. Cabeca
*Attorney, Agent, or Firm*—Pepe & Hazard

[57] ABSTRACT

A drive assembly comprises a DC electric motor and an integrated charger/controller/regenerator which includes a power module, a step-down module and a control circuit. The input of the power module is connected to an electric power source during charging, and to the DC motor during regenerative braking. The input of the step-down module is connected to the power module, and the output is connected to the battery. The control circuit includes a multiplicity of switches, and has three modes of operation: driving, regenerative braking and charging. During driving, the switches connect the battery to the power module input and the power module output to the DC motor. During regenerative braking, the switches connect the DC motor to the power module input and the power module output to the step-down module input, and the step-down module output charges the battery. During charging, the switches connect the power module output to the step-down module input, and the step-down module output charges the battery.

6 Claims, 4 Drawing Sheets

DC MOTOR DRIVE ASSEMBLY HAVING A CONTROLLER/CHARGE WITH REGENERATIVE BRAKING

The present application is a continuation-in-part of our application Ser. No. 08/399,814 filed Mar. 7, 1995, now abandoned.

BACKGROUND OF THE INVENTION

This invention relates generally to drive assemblies including a DC motor, battery and charger, and, more particularly, to such a drive assembly which includes an integrated electronic charger/controller/regenerator.

Conventional battery operated motors utilize separate battery chargers and motor controller circuits. Although these circuits may utilize similar components, the controller and the charger are not operated at the same time. Separate chargers and controllers increase the number of components, cost, size, and weight which is especially critical in the design of electrically powered vehicles.

Recently, integrated battery charger and motor controllers have been developed. Exemplary of such devices are those illustrated in Ripple U.S. Pat. Nos. 4,920,475 and 5,099,186, Slicker U.S. Pat. No. 4,491,768 and Coconi U.S. Pat. No. 5,341,075. The integrated charger/controllers of these patents are utilized for single phase battery chargers and polyphase AC electric motor controllers. In comparison to a single phase DC motor, a polyphase AC motor requires a relatively more complex device to generate the rotating magnetic field which operates the motor. Moreover, polyphase AC motor controllers should not be used to drive single phase DC motors. In addition, the integrated charger/controllers of these patents utilize a step-up converter to achieve high voltage recharge levels for high power batteries.

It is often desirable to provide regenerative braking in DC motors in order to increase the range of the battery powered electric vehicles in which DC motors are utilized. During regenerative braking, the direction of the flow of electrical power between the battery and the DC motor during driving is reversed by either maintaining the direction of current flow constant while reversing the voltage polarity, or by reversing the direction of current flow while maintaining the polarity of the voltage. Conventional integrated charger/controllers utilize separate electronic circuits such as free wheel diodes and bridge circuits to enable such regenerative power supply to the battery.

Accordingly, it is an object of the present invention to provide an electric drive assembly for vehicles which includes a novel integrated battery charger, DC motor controller, and regenerator.

It is also an object to provide such a drive assembly which utilizes a low power battery and a single phase DC electric motor.

Another object is to provide such a drive assembly which is relatively simple in construction and reliable in operation.

A further object is to provide a novel method for charging the battery and controlling a DC electric motor in a vehicle.

SUMMARY OF THE INVENTION

It has now been found that the foregoing and related objects may be readily attained in a drive assembly comprising a DC electric motor and an integrated charger/controller/regenerator for controlling the DC electric motor in a drive mode of operation, for charging a battery in a regenerative braking mode of operation, and for connection to an electric power source for charging the battery in a charge mode of operation. The integrated charger/controller/regenerator includes a power module, step-down module and control circuit. The input of the power module is connected to an electric power source during the charge mode of operation, and to the DC motor during the regenerative braking mode of operation.

The input of the step-down module is connected to the power module, and the output is connected to the battery. The control circuit includes switch means having a multiplicity of switches, and has three modes of operation: driving, regenerative braking and charging. During driving, the switches selectively connect the battery to the input of the power module and the output of the power module to the DC motor to control the DC motor. During regenerative braking, the switches selectively connect the DC motor to the input of the power module and the output of the power module to the input of the step-down module, and the output of the step-down module is connected to the battery to charge it. During charging, the input of the power module is connected to the electric power source, and the switches selectively connect the output of the power module to the input of the step-down module, and the output of the step-down module is connected to the battery to charge it.

Preferably, the step-down module includes a transistor, a diode and an inductor, the transistor being connected in parallel with the diode and connected in series with the inductor. Generally, another transistor is connected in parallel with the diode and the inductor of the step-down module, and the other transistor controls the DC current output of the DC motor during the regenerative braking mode of operation. Desirably, the power module includes the transistor of the step-down module which is closed, and the other transistor is pulse width modulated to periodically short circuit the DC motor to reverse the direction of the current to charge the battery during the regenerative braking mode of operation.

Preferably, the power module is a programmable pulse width modulated converter having power transistors and a parallel/series switching system which connects the power transistors in series during the charge mode of operation. These power transistors rectify the AC current input to the DC current output of the power module and the parallel/series switching system connects the power transistors in parallel during the drive mode of operation to control the associated DC motor.

Generally, the voltage of the output of the step-down module is not greater than 100 volts.

DETAILED DESCRIPTION OF THE PREFERRED EMBODIMENTS

Figure 1:
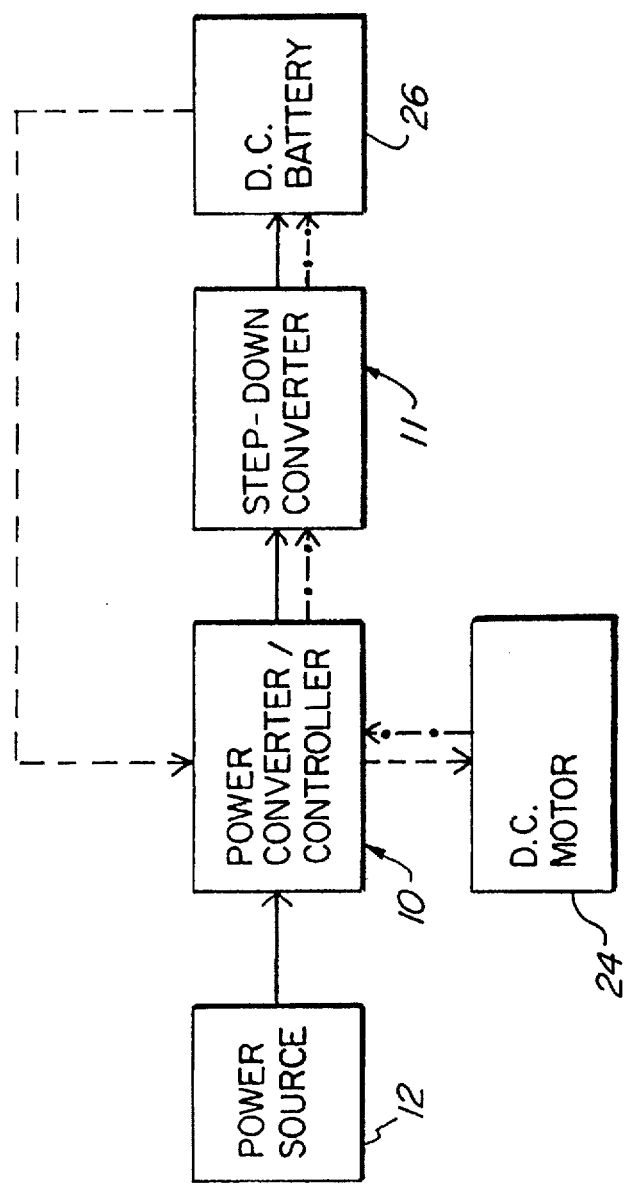
FIG. 1 is a block diagram of a drive assembly embodying the present invention.

Turning first to FIG. 1, a block diagram of a drive assembly embodying the present invention is illustrated as comprised of a DC motor 24 which derives power through a power controller 10 from a battery 26. The power controller 10 also channels power from an electric power source 12 which may be either AC or DC to a battery 26 through a step-down converter 11.

The integrated charger/controller/regenerator has three modes of operation: (1) a charge mode as indicated by the solid arrows; (2) a drive mode as indicated by the dashed arrows; and (3) a regenerative brake mode as indicated by the dash-dot arrows.

During the charge mode of operation, the input of the power controller 10 is connected to an electric power source 12 (which can be either DC or AC) and the output of the power controller 10 supplies DC current. If an AC power source is used, the power controller 10 rectifies the AC current input to produce a DC current output, and if a DC power source is used, the DC current would flow unrectified through the power controller 10. The voltage of the DC current from the power controller 10 is then lowered by a step-down converter 11 to a voltage level which slightly exceeds the voltage level of the low voltage battery 26.

If the battery 26 is sufficiently charged, the drive mode may commence during which the DC current from battery 26 is controlled by the power controller 10, which in turn supplies a single phase DC voltage to drive the DC motor 24.

During the regenerative braking mode which may occur at various times during operation of the motor, the power controller 10 in conjunction with the step-down converter 11 reverses the flow of current from the DC motor 24 while maintaining the polarity of the voltage to charge the battery 26.

Thus, the integrated power charger/controller/regenerator performs the functions of voltage conversion during the charge mode of operation, voltage regulation during the drive mode of operation, and regeneration during the regenerative braking mode of operation.

Figure 2:
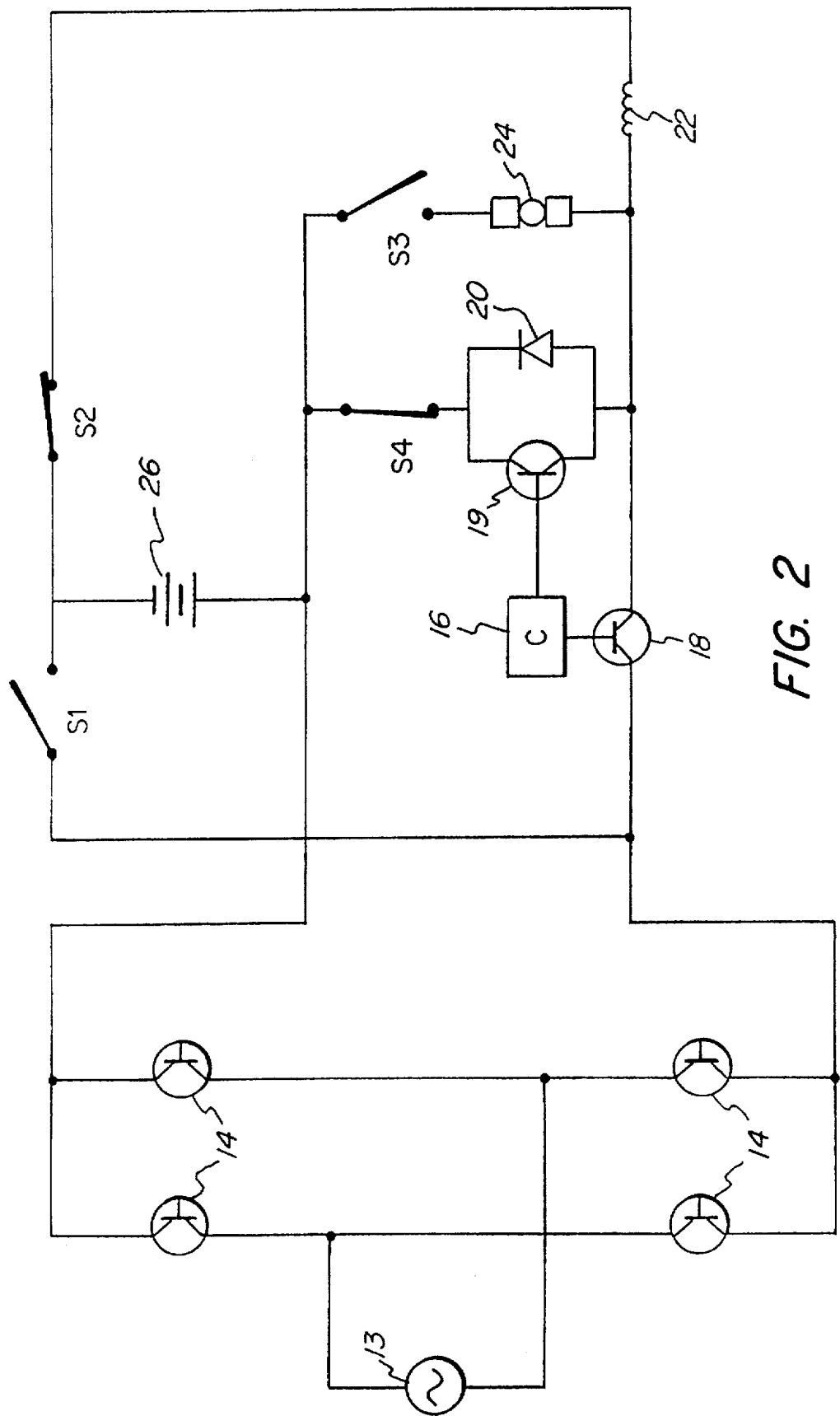
FIG. 2 is a circuit diagram of the integrated charger/controller/regenerator of the present invention showing the high voltage power transistors of the pulse width modulator connected in series to rectify the AC input during the charge mode of operation.

Turning next to FIG. 2, therein schematically illustrated is the circuitry of the integrated charger/controller/regenerator of the present invention during the charge mode of operation. The AC power source 13 current is rectified by power transistors 14 which are connected in series during the charge mode of operation. The power controller 10 includes a programmable pulse width modulator (PWM) which, in turn, includes the power transistors 14, a microprocessor control circuit 16, a switching transistor 18, a switching transistor 19 with an instrinsic diode 20, and electronic switches S1, S2, S3, and S4.

During the charge mode of operation, the switches S2 and S4 are closed to connect the battery 26 with the low voltage DC output of the step-down converter 11. The rectified voltage output of transistors 14 is then lowered to the charging voltage level for the battery 26 by the step-down converter 11. The step-down converter 11, in turn, includes a transistor 18 connected in series to a diode 20 and connected in parallel to an inductor 22, because switch S1 is open and all the current flows through the transistor 18.

The power transistor 19 is connected in parallel to the diode 20, and are both part of the same transistor. During the charge mode of operation, however, the transistor 19 remains open circuited and allows current to pass through the diode 20. In this manner, DC current is supplied to charge the battery 26.

Figure 3:
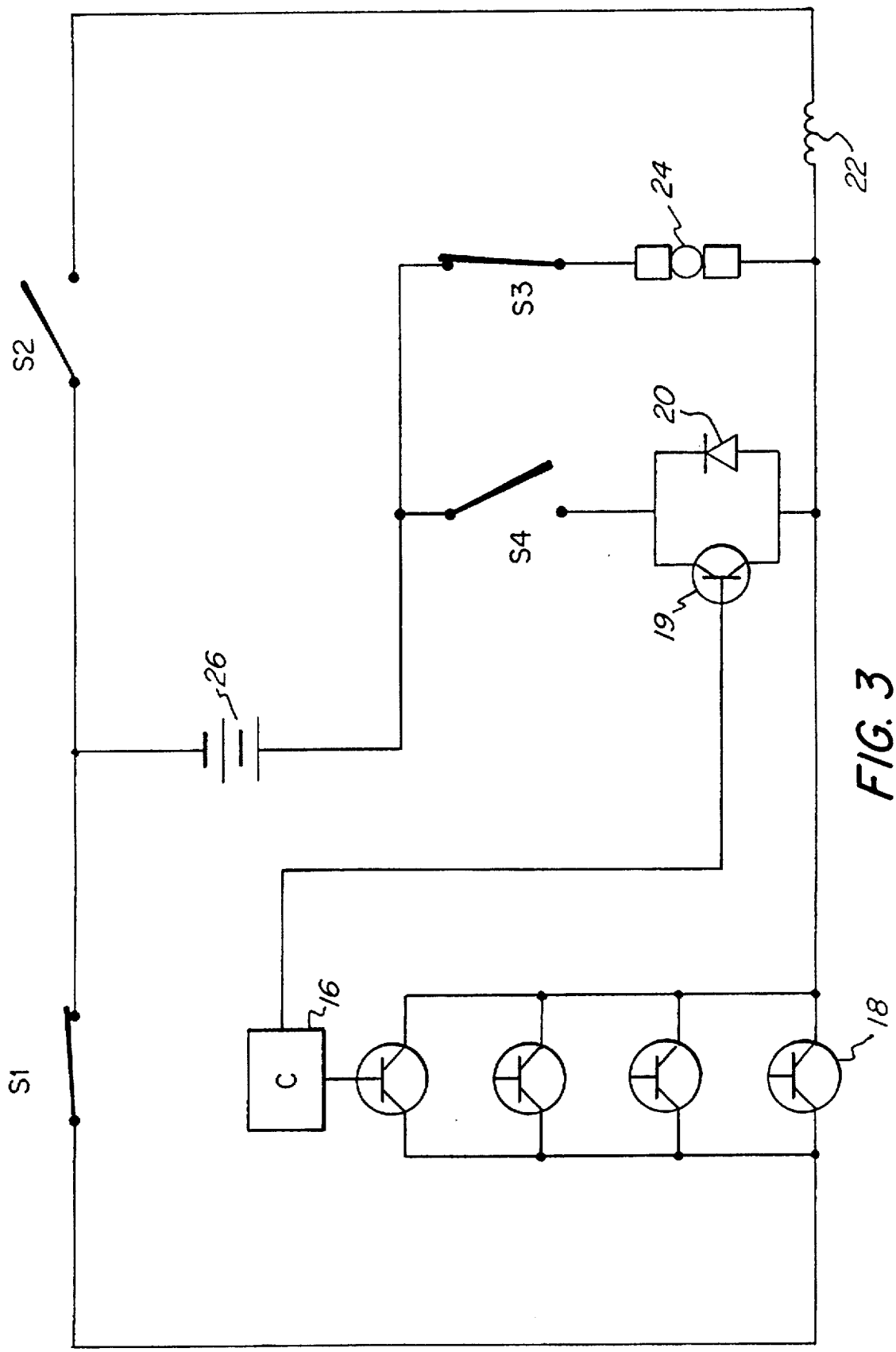
FIG. 3 is a circuit diagram of the integrated charger/controller/regenerator showing the high voltage power transistors of the pulse width modulator connected in parallel to control the DC motor during the drive mode of operation; and, FIG. 4 is a circuit diagram of the integrated charger/controller/regenerator showing the pulse width modulated transistor connected in parallel to the diode of the step-down converter to reverse the flow of current during the regenerative braking mode of operation.

Turning next to FIG. 3, the schematic circuit diagram shows the integrated charger/controller/regenerator of the present invention during the drive mode of operation. The PWM microprocessor control circuit 16 connects the power transistors 14, 18 in parallel during the drive mode of operation. The switches S1 and S3 are closed and the switches S4 and S2 are opened to connect the DC battery 26 to the power transistors 14, 18 which in turn supply a controlled voltage output to drive the motor 24.

Figure 4:
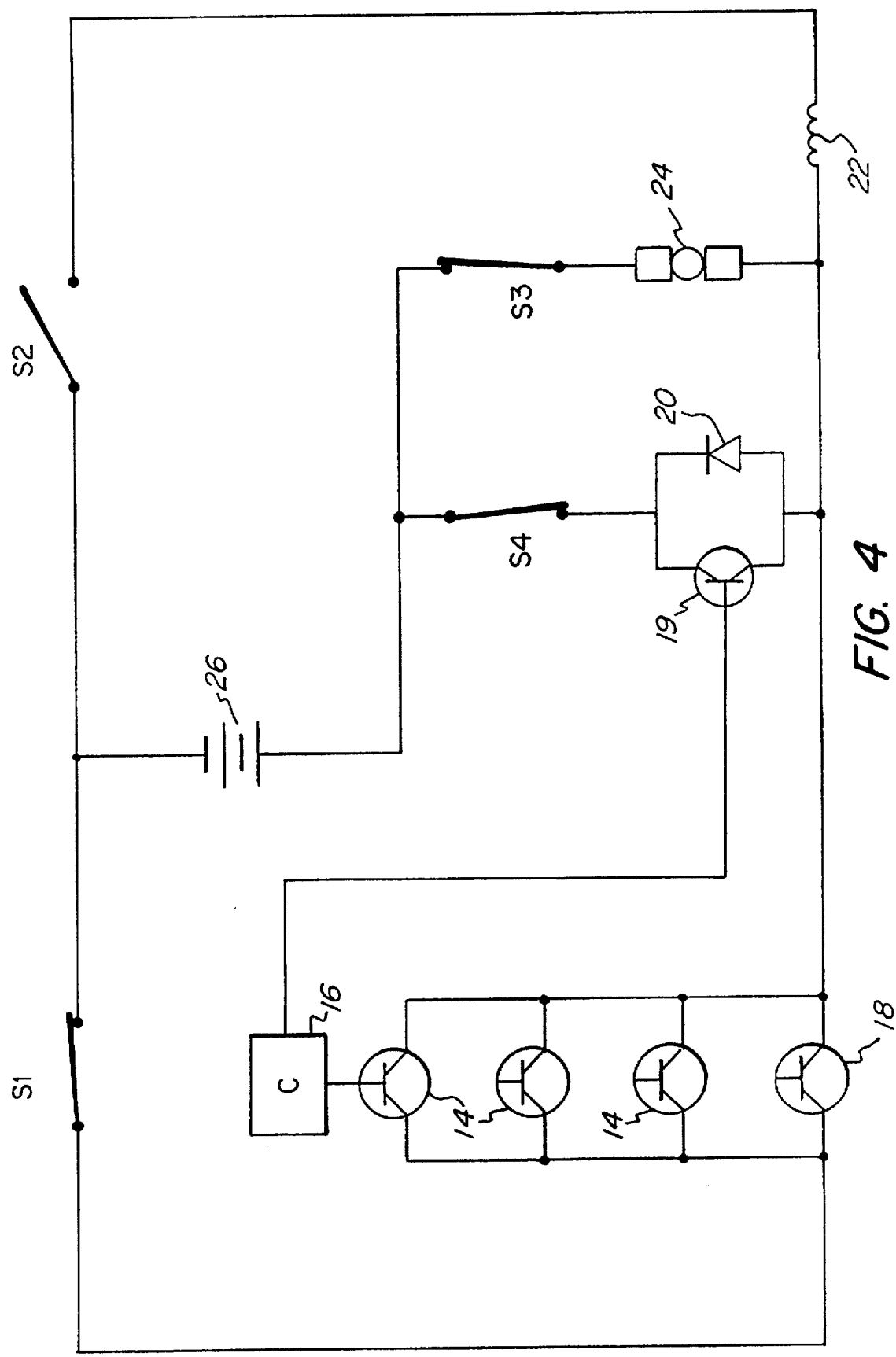

As illustrated in FIG. 4, the switches S1, S3, and S4 are closed and the switch S2 is opened during the regenerative braking mode of operation. The PWM microprocessor control circuit 16 closes the switching transistors 14, 18 while pulse width modulating the transistor 19 to periodically short-circuit the DC motor 24 and reverse the direction of the current while maintaining the polarity of the voltage to charge the battery 26 and brake the DC motor 24.

The programmable PWM of the integrated charger/controller circuit allows the programming of various charging characteristics for charging batteries having a variety of characteristics. Accordingly, each battery may utilize a proprietary charging algorithm. In addition, the PWM may also be used as a pulse charger to increase the battery cycle life, or to quick charge the battery.

Thus, it can be seen from the foregoing detailed description and attached drawings that the drive assembly of the present invention includes an integrated charger/controller/regenerator which eliminates redundant components of separate chargers and controllers and thereby achieves savings in terms of cost, weight and space. It enables efficient use of low power batteries and single phase DC motors.

Having thus described the invention, what is claimed is:

1. A drive assembly comprising: (i) a DC electric motor; and (ii) an integrated charger/controller/regenerator for controlling said DC electric motor in a drive mode of operation, for charging a battery in a regenerative braking mode of operation, and for connection to an electric power source for charging the battery in a charge mode of operation including (a) a power module having an output and an input for connection to the associated electric power source during a charge mode of operation, said input of said power module being connected to said DC motor during a regenerative braking mode of operation in which said power module provides a DC current to said output;

(b) a step-down module having an input connected to said power module and an output adapted to be connected to terminals of an associated battery;

(c) a control circuit including switch means having a multiplicity of switches, said control circuit having (i) selected ones of said switches selectively effect the connection of the terminals of the associated battery to said input of said power module and selected ones of said switches selectively effect the connection of said output of said power module to said DC motor wherein said power module controls said DC motor;

(ii) a regenerative braking mode of operation during which selected ones of said switches selectively effect the connection of said DC motor to said input of said power module and selectively effect the connection of said output of said power module to said input of said step-down module, said output of said step-down module being connectable to the terminals of the associated battery to effect charging thereof; and (iii) a charge mode of operation during which said input of said power module is connected to the associated electric power source, selected ones of said switches selectively effect the connection of said output of said power module to said input of said step-down module, said output of said step-down module being connectable to the terminals of the associated battery to effect charging thereof.

2. The drive assembly according to claim 1 wherein said step-down module includes a transistor, a diode and an inductor, said transistor being connected in parallel with said diode and connected in series with said inductor.

3. The drive assembly according to claim 2 wherein another transistor is connected in parallel with said diode and said inductor of said step-down module, said other transistor controlling the DC current output of said DC motor during said regenerative braking mode of operation.

4. The drive assembly according to claim 3 wherein said power module includes said transistor of said step-down module, and wherein said transistor is closed and said other transistor is pulse width modulated to periodically short circuit said DC motor to reverse the direction of the current to charge the battery during said regenerative braking mode of operation.

5. The drive assembly according to claim 4 wherein said power module is a programmable pulse width modulated converter having power transistors and a parallel/series switching system which connects said power transistors in series during said charge mode of operation, wherein said power transistors rectify the associated AC current input to said DC current output of said power module and said parallel/series switching system connects said power transistors in parallel during said drive mode of operation to control the associated DC motor.

6. The drive assembly according to claim 1 wherein the voltage of said output of said step-down module is not greater than 100 volts.

* * * * *